United States Patent
Horton

(10) Patent No.: US 7,028,084 B1
(45) Date of Patent: Apr. 11, 2006

(54) XDSL CONNECTION MONITOR

(75) Inventor: John J. Horton, Canton, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 729 days.

(21) Appl. No.: 09/669,852

(22) Filed: Sep. 27, 2000

(51) Int. Cl.
G06F 15/16 (2006.01)

(52) U.S. Cl. ...................................... 709/224; 709/223
(58) Field of Classification Search ................ 709/227, 709/238, 239, 221, 224; 714/4, 43, 57
See application file for complete search history.

(56) References Cited

U.S. PATENT DOCUMENTS

| | | | |
|---|---|---|---|
| 5,835,721 A * | 11/1998 | Donahue et al. ............ 709/224 |
| 5,959,974 A | 9/1999 | Badt | |
| 5,964,837 A | 10/1999 | Chao | |
| 6,021,507 A * | 2/2000 | Chen ............................ 714/2 |
| 6,028,984 A * | 2/2000 | Kimball ...................... 709/249 |
| 6,108,300 A * | 8/2000 | Coile et al. ................. 370/217 |
| 6,205,579 B1 | 3/2001 | Southgate | |
| 6,295,558 B1 * | 9/2001 | Davis et al. ................. 709/224 |
| 6,314,512 B1 * | 11/2001 | Branson et al. ............ 712/224 |
| 6,356,622 B1 * | 3/2002 | Hassell et al. ............ 379/1.01 |
| 6,392,990 B1 | 5/2002 | Tosey | |
| 6,457,879 B1 * | 10/2002 | Thurlow et al. ............ 709/206 |
| 6,470,395 B1 | 10/2002 | Van Aken | |
| 6,480,469 B1 * | 11/2002 | Moore et al. ................ 370/241 |
| 6,557,038 B1 | 4/2003 | Becker | |
| 6,574,197 B1 | 6/2003 | Kanamaru | |
| 6,606,659 B1 | 8/2003 | Hegli | |
| 6,609,154 B1 | 8/2003 | Fuh | |
| 6,611,868 B1 | 8/2003 | Arutyunov | |
| 6,622,179 B1 | 9/2003 | Welder | |
| 6,640,239 B1 | 10/2003 | Gidwani | |
| 6,654,914 B1 * | 11/2003 | Kaffine et al. ................ 714/43 |
| 6,668,282 B1 | 12/2003 | Booth, III | |
| 6,747,957 B1 | 6/2004 | Pithawala | |
| 2001/0056503 A1 * | 12/2001 | Hibbard ...................... 709/250 |

OTHER PUBLICATIONS

Vicomsoft SoftRouter overview. May 18, 2000. Internet Archive Wayback Machine. http://web.archive.org/web/20000518160753/www.vicomsoft.com/softrouter/info/sfr-.fallback.html.*

(Continued)

Primary Examiner—Dung C. Dinh
Assistant Examiner—Aaron Strange
(74) Attorney, Agent, or Firm—Withers & Keys, LLC

(57) ABSTRACT

A system and method of maintaining communication between a computer and a server, the server being in communication with the computer via xDSL service or dial-up modem service, with xDSL service being the default mode of communication, the method including sending a request to the server via xDSL service to which the server should respond and determining if a response has been received. If no response has been received, displaying on the computer a message (i) indicating that xDSL service has failed and (ii) offering to establish communication between the computer and the server via the dial-up modem, and thereafter changing the default mode of communication between the computer and the server to dial-up modem service. In a preferred embodiment, an xDSL service provider monitors dial-up modem communications and determines if the computer dialing in normally establishes communication with the server via xDSL service. The xDSL service provider can thus quickly and easily detect xDSL failures.

8 Claims, 3 Drawing Sheets

OTHER PUBLICATIONS

Vicomsoft SoftRouter overview. May 18, 2000. Internet Archive Wayback Machine. Retreived from http://web.archive.org/web/200000518160753/http://www.vicomsoft.com/softrouter/info/sfr.fallback.html on Dec. 10, 2003.*

Connection Failover. Web Page. retreived from http://www.kerio.com/manual/kwf/en/ch04s02.html on Jun. 8, 2004.*

Connection Fallback. May 2000. Excerpt from VicomSoft Server User Guide for Windows. Entire document available at: http://ftp2.vicomsoft.com/win/documents/server.userguide.66.pdf.*

Peyton Engel. "What are NT Services?". May 24, 1999. Retreived from http://www.mailbag.com/users/pengel/whatare.html on Jun. 8, 2004.*

"xDSL—Digital Subscriber Line Dedicated Services". 1999. Web page. Retreived from http://www.rawbandwidth.com/oldsite/services/dsl.html on Jun. 7, 2004.*

* cited by examiner

XDSL CONNECTION MONITOR

GOVERNMENT RIGHTS NOTICE

This invention was made with Government support under grant nos. DE-FG03-92ER81275 (SBIR) awarded by the Department of Energy and/or H600813-1, -2 between Affymetrix, Inc. and the National Institutes of Health. The Government has certain rights in this inventions.

BACKGROUND

1. Field of the Invention

The present invention is directed to methods and systems for providing Internet access. More particularly, the present invention is directed to monitoring the status or availability of Internet access that is provided to a user via digital subscriber line (DSL) service.

2. Background of the Invention

The use of the Internet has grown so quickly over the past several years that even home Internet users and small businesses are now demanding higher speed and higher bandwidth connections from their Internet Service Providers (ISPs). There have been several different responses to this demand: (i) cable television providers have deployed cable modems that provide Internet connectivity via existing cable television infrastructure, (ii) satellite communications providers have configured satellites to operate as segments of high speed wireless networks to boost Internet connection speed and (iii) telephone companies have become ISPs by implementing digital subscriber line (DSL) service using the existing copper telephone wire network. Of these three responses, DSL is quickly becoming the most popular consumer choice for Internet connectivity. Several kinds of DSL service, collectively referred to as xDSL services, are being increasingly offered by local telephone companies. Asymmetrical DSL (ADSL), for example, is one well-known form of xDSL service that has become popular among xDSL service providers and users, customers or subscribers.

A significant advantage to employing xDSL service is that almost every household that might be interested in obtaining Internet access is already a part of the local telephone network and thus has connectivity with a telephone company via conventional copper "twisted pair" telephone wiring. Accordingly, except for a new modem, no additional home wiring or infrastructure is required.

Another advantage to using xDSL for Internet connectivity is that one's Internet access is "always-on." This is in contrast to conventional dial-up modem Internet access which requires a set-up procedure each time Internet access is desired.

Because xDSL access is presumably "always-on," not surprisingly, users expect this to be the case at all times. In reality, however, xDSL service may go down from time to time due to network failures. Network components that may be susceptible to failure include cables, routers, and digital subscriber line access multiplexers (DSLAMs). These components are typically located between the user's DSL modem and the xDSL service provider's Domain Naming System (DNS) server which, itself, is connected to an Internet backbone such as UUNET. Further, software that runs some of these network components can also cause unexpected failures.

Surprisingly, a user of xDSL service may not immediately become aware that his Internet access has been cut off. Indeed, many people who are only casual users of the Internet do not understand the complexities of electronic networks and would not necessarily know if or why their Internet connection has failed. All that is known is that they cannot "surf" the world wide web, download files, or send or receive email via the Internet. The sudden realization that Internet access has failed can be very frustrating to a user.

Further, when xDSL service outages occur, users may call their xDSL provider to report the outage and demand that Internet access be restored as quickly as possible. While such calls are helpful to the xDSL provider to the extent that network outages can be identified, these calls are also taxing on the xDSL provider in that operators must be employed to field and manage calls from customers.

SUMMARY OF THE INVENTION

The present invention provides a method and system for (i) notifying a user that his xDSL service has failed and (ii) automatically offering the user the option of employing a conventional dial-up modem accessing the Internet. In accordance with the present invention, the user is immediately, or preemptively, notified of an xDSL failure such that he is no longer unexpectedly confronted by a failure of his Internet access, and is offered back-up access to the Internet. Accordingly, because users will then be less likely to call their xDSL service provider to report problems, the xDSL provider can employ fewer customer service representatives to field such calls.

Under the present invention, by automatically offering the option of accessing the Internet via dial-up modem, the user, customer or subscriber is given the opportunity to access the Internet, albeit at somewhat lower speed, while his primary access via xDSL service is down. This is an important advantage of the present invention, because many users of xDSL services do not even know that they can access the Internet using their dial-up modem can still be utilized.

Also, in a preferred embodiment of the present invention, the xDSL service provider is also automatically notified that a user who normally uses xDSL service has just used a dial-up modem to access the Internet. With this information, the xDSL provider can efficiently track network outages without having to field customer calls. For example, a trouble ticket can be generated for the appropriate network administrator or serviceperson indicating that xDSL service for a particular account is out of service.

In a preferred embodiment of the present invention, a request to which a response is expected is automatically and periodically sent from a user's computer using his xDSL service. The request is preferably directed to the xDSL service provider's Domain Naming System (DNS) server. It is next determined if a response to the request is subsequently received. If no response is received, it is assumed that the user's xDSL service has failed since xDSL service is expected to be "always on." A notification message is then displayed on the user's computer indicating that his xDSL service is "temporarily down."

The notification message also preferably gives the user the option of accessing the Internet via a dial-up modem while his xDSL service is down. When the user does access the Internet via dial-up modem, the xDSL provider (using customer account information, for example) determines that this particular user normally accesses the Internet via xDSL. The xDSL provider can then track network outages and quickly resolve such outages without having to employ telephone operators to field calls from users.

In an alternative embodiment of the present invention, when it is determined that xDSL service has gone down, then the dial-up modem is automatically, i.e., without user intervention, used to access the ISP's DNS server. In this way, the failure of xDSL service can be promptly detected by the ISP even if the user is not operating his computer.

In a preferred embodiment of the present invention, the "request" that is sent is a "ping" request or command that is directed to a predetermined Internet Protocol (IP) address. Most preferably, the IP address is that of a DNS server of the xDSL provider, although other IP addresses may be used.

Aspects of the present invention are preferably implemented using software, e.g., an applet (a relatively small software application), that resides on the user's computer. It is this software that causes the requests to be sent periodically. In a preferred implementation, the software is operable at all times, i.e., it is an active program running within a multi-tasking operating system such as Microsoft Windows 2000, UNIX or Linux. The software can be stored on a computer's hard drive, incorporated in firmware or stored using a combination of these storage methods.

From the xDSL service provider's perspective, the present invention provides a system and method for monitoring xDSL service failures by monitoring customer use of dial-up modems instead of xDSL service. As a result, the xDSL service provider can quickly and accurately identify xDSL service failures and mobilize the necessary personnel or resources to resolve the problem.

It is therefore an object of the present invention to provide a method and system for notifying a user that his xDSL service is down.

It is yet another object of the present invention to provide a method and system for notifying a user of the status of his xDSL Internet access.

It is another object of the present invention to provide a software application that periodically attempts communication via the Internet over xDSL and continuously runs in the background of a multi-tasking operating system.

It is also an object of the present invention to provide a method and system for notifying a user that his Internet access via xDSL service has been restored.

It is another object of the present invention to provide a method and system for offering to a user of xDSL service the option of connecting to the Internet via a dial-up modem when the user's xDSL service is down.

It is still another object of the present invention to provide a method and system for tracking xDSL service outages by monitoring the use of dial-up modem in lieu of xDSL service.

These and other objects of the present invention will become apparent upon a reading of the following detailed description in conjunction with the accompanying drawings.

DETAILED DESCRIPTION OF THE INVENTION

The present invention is directed to a system and method for monitoring a user's xDSL connection and notifying the user when his xDSL connection fails. The present invention also provides a system and method for notifying the user when his xDSL connection has been restored. At the time the user's xDSL connection fails, the user preferably is offered to employ a conventional dial-up modem for accessing the Internet by being prompted by, for example, a pop-up window. If the user chooses to access the Internet via his dial-up modem, then the xDSL service provider/Internet service provider (ISP) preferably detects that this user normally accesses the Internet via xDSL service and, for example, automatically generates a trouble ticket indicating that the xDSL service via which the user normally accesses the Internet has failed. In an alternative embodiment, which is particularly useful when the effected user is not present, the user's computer automatically enables the dial-up modem to access the Internet. By capturing and storing one or even several trouble tickets indicative of apparent xDSL service failures, the xDSL service provider/ISP can obtain a high level view of its xDSL network and quickly detect and correct instances of failure.

Figure 1:
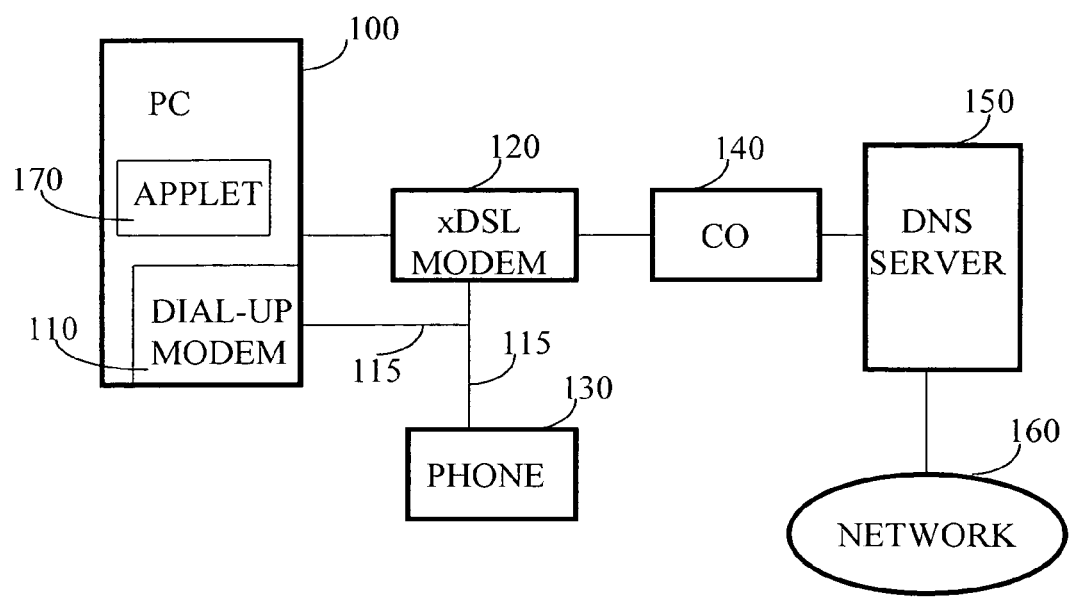
FIG. 1 is a schematic illustration of a network topology including the location of an applet (software) for implementing aspects of the present invention.

FIG. 1 is a schematic illustration of a network topology including the identification of an applet 170 for implementing aspects of the present invention. A personal computer (PC) 100 includes a dial-up modem 110 connected to a telephone line 115. PC 100 is connected to xDSL modem 120 in the conventional manner. Those skilled in the art will appreciate that xDSL modem 120 can be a stand-alone device (as shown), can be incorporated directly into PC 100 or can be incorporated into, for example, a router (not shown). A conventional telephone 130 is shown connected to xDSL modem 120. Those skilled in the art will appreciate that xDSL service implementation might also require a splitter (not shown) to effect connection of telephone 130 and PC 100 via xDSL modem 120. xDSL modem 120 is connected to, typically, a telephone company's central office (CO) 140 and other telephone network components by copper telephone wires 125. While not shown, CO 140 and other telephone network components might include, for example, one or more digital subscriber line access multiplexers (DSLAMs), routers and cabling.

CO 140 is connected to the xDSL service provider's Domain Naming System (DNS) server 150 which, in turn, is connected to an electronic network 160, such as the Internet.

Experience has shown that when xDSL service fails, the failure typically occurs somewhere between the user's xDSL modem and a DNS server. Of course, it is also possible that the DNS server itself might fail. Thus, even if a user's PC 100 and xDSL modem 120 are operating normally, the user's xDSL service might not be available. However, since xDSL service is an "always on" service, the user might not necessarily know when, or if, his xDSL service has become unavailable, i.e., has failed or gone down. The present invention provides the user with information that his xDSL service has indeed failed as well as when it has been restored. Accordingly, the present invention removes some of the frustrating "guess work" that users (and especially non-expert users) must endure when it appears that their Internet connection is not functioning.

An aspect of the present invention is shown in FIG. 1 as applet 170, which is stored in PC 100. The applet may be stored on a hard drive of PC 100 or may be stored as firmware in PC 100. Alternatively, applet 170 may be stored in PC 100 via a combination of these two methods. As will be explained in more detail below, applet 170 periodically and automatically attempts to access DNS server 150 via xDSL service. If applet 170 fails to receive a response from DNS server 150 then it is assumed that the xDSL service for that particular user must have failed. In such a case, and in accordance with the present invention, applet 170 displays a message for a user indicating that the user's xDSL service is presently or "temporarily" out of order. Since applet 170 preferably continues its periodic attempt to contact DNS server 150, as soon as applet 170 receives a response from DNS server 150, a message is displayed for the user that his xDSL service has been restored.

Figure 2:
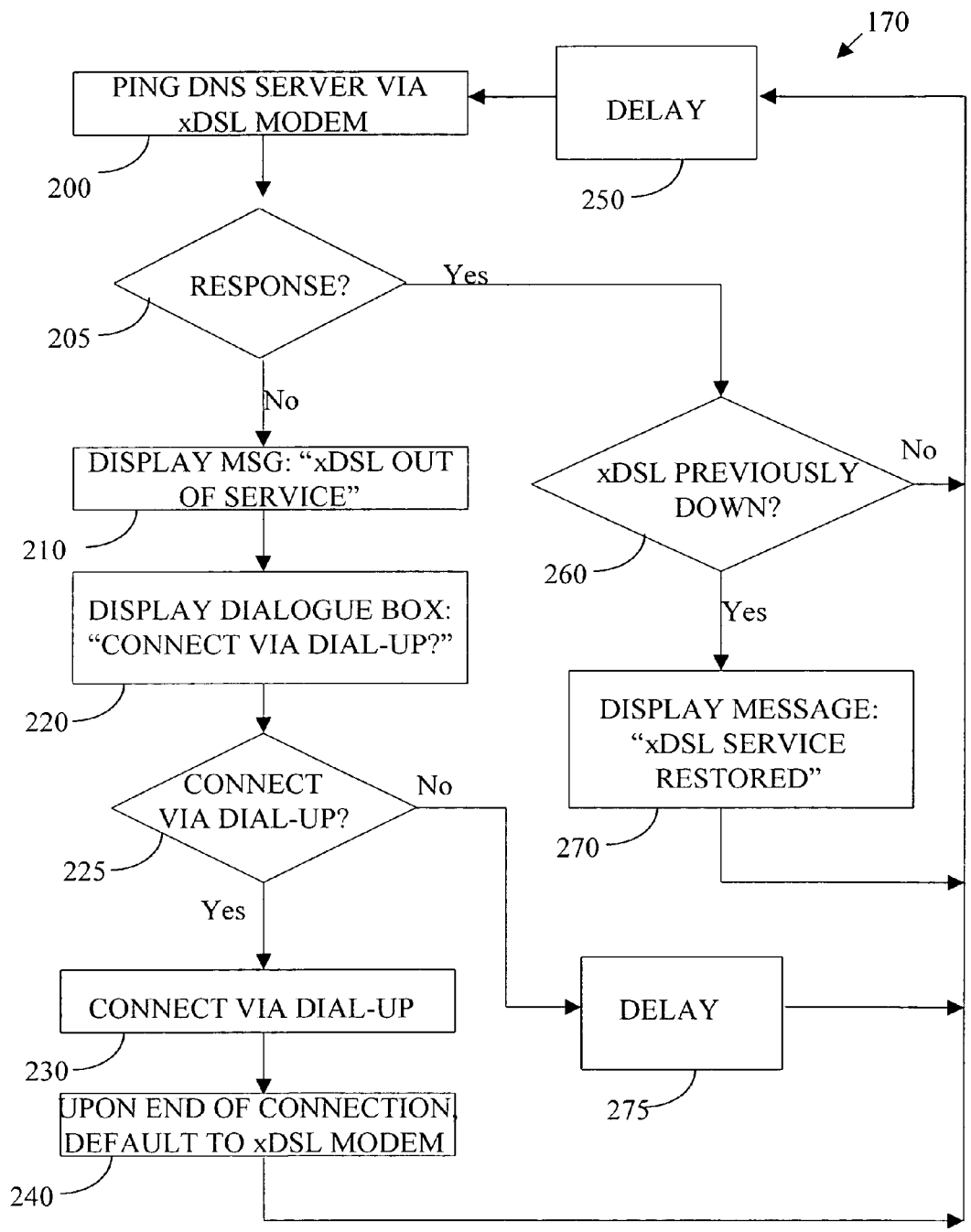
FIG. 2 is a flowchart illustrating a preferred embodiment of the applet of the present invention.

FIG. 2 is a flowchart illustrating a preferred embodiment of applet 170. At step 200, applet 170 preferably issues a ping command to DNS server 150 via xDSL modem 120. That is, applet 170 attempts to contact DNS server 150 with a request using the user's xDSL service. The well-known ping command is used as a request since such a request requires very little bandwith and is responded to by the destination (in this case DNS server 150) very quickly. At step 205 it is determined whether there has been a response to the ping command. If no response has been received then, at step 210, it is assumed that xDSL service has failed and a message is then displayed for the user in the form of, for example, a pop-up window indicating that the user's xDSL is out of service. Immediately thereafter, or in conjunction with the pop-up window of step 210, a dialogue box is displayed as indicated at step 220. This dialogue box includes a query to the user asking him if he would like to connect to the Internet via dial-up modem. This dialogue box preferably includes buttons that may be enabled via an "enter" key or a mouse, as is conventional. If the user decides not to connect via dial-up modem (step 225) he may "click" an associated "no" button within the dialogue box (not shown), which preferably removes the dialogue box from the screen. In such a case, the delay of step 275 may be implemented, which is preferably longer than the delay of step 250 (described below), e.g., 30 minutes to 10 hours. Thus, even though the user has been made aware that his xDSL service has failed and also been made aware that he may access the Internet via dial-up modem, he may nevertheless choose not to access the Internet at that time.

On the other hand, if the user chooses to connect via dial-up modem in view of the failure of his xDSL service and his desire to access the Internet, he preferably "clicks" a "yes" button within the dialogue box (not shown).

If the user does choose to connect via dial-up modem, applet 170 of the present invention preferably changes the default modem setting in the operating system of PC 100 from xDSL modem 120 to dial-up modem 110. Changing the default modem can be accomplished using the "dial-up networking" selection features of an operating system such as Windows 95, manufactured by Microsoft Corporation. Applet 170 preferably automatically displays the appropriate window(s) for choosing a dial-up modem.

Then, at step 230, the user connects to the Internet via his dial-up modem. At step 240, upon the end of the user's session on the Internet, applet 170 preferably resets the default modem to xDSL modem 120. The process then passes to step 250 where there is a one to ten minute delay, for example, after which the process begins again at step 200. Of course, delay 250 can be set to any desired length of time that will give the user useful information concerning the availability of his xDSL service.

If a response to the ping command is received at step 205, at step 260 it is determined whether on the previous iteration of step 205 a response was received. That is, it is determined whether xDSL service was down on the previous iteration through step 205. If not, the process continues with step 250. Those skilled in the art will appreciate that the loop comprising steps 200, 205, 260, and 250 can be considered a "steady-state" of applet 170. That is, assuming xDSL service is operating normally, applet 170 will continue to loop through these four steps as long as the xDSL service continues to operate normally.

If at step 260 xDSL service was previously down, then at step 270 a message is displayed for the user indicating that his xDSL service is now restored. Again, the process continues with step 250. Like the message display of step 210, the message display of 270 can also be in the form of a pop-up window.

In a preferred embodiment of the present invention, applet 170 is implemented in software using well-known high level languages such as C, C++, or Visual Basic. The source code itself or an executable version of the source code can be stored on PC 100 via hard drive and/or firmware. Further, applet 170 is preferably accessible by an operating system of PC 100 such that when PC 100 is first booted, applet 170 is automatically launched and thereafter performs its iterative process until PC 100 is subsequently shut down. Such techniques are well-known to those skilled in the art.

What has been described so far is how the present invention is beneficial from an xDSL user's perspective. However, the present invention is also advantageous from the xDSL service provider's point of view. Specifically, by proactively offering the user, customer or subscriber the option of using his dial-up modem to access the Internet, the user, while possibly upset that his relatively fast xDSL connection is temporarily not available, is nevertheless given the opportunity to access the Internet. Thus, the customer is not precluded from accessing the Internet when xDSL service fails and will therefore likely remain satisfied with his overall level of service.

Figure 3:
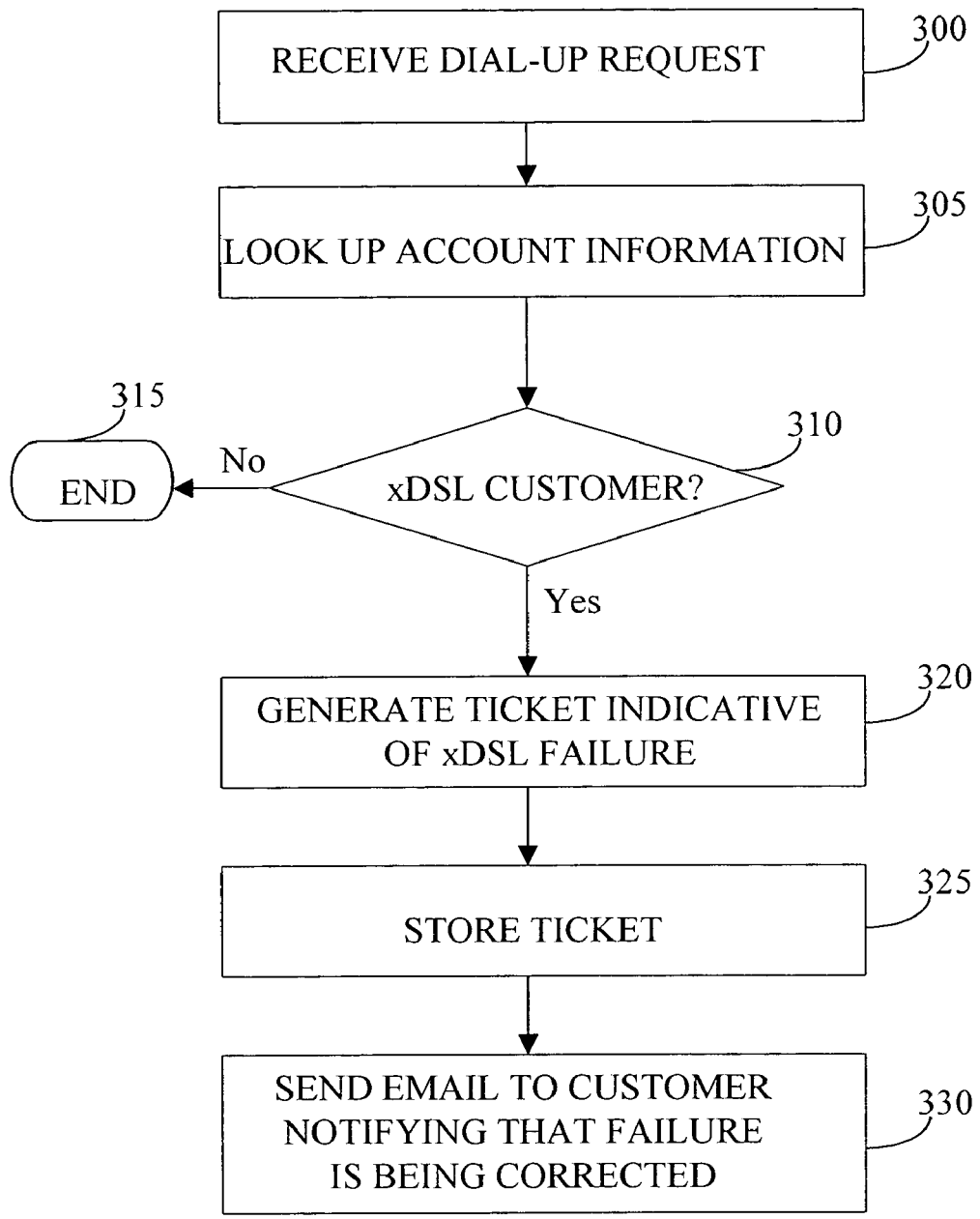
FIG. 3 is a flowchart illustrating a preferred embodiment of an xDSL service provider process in accordance with the present invention.

More importantly, however, when a user who normally accesses the Internet via xDSL service suddenly uses a dial-up modem to access DNS server 150, the service provider can assess the "health" of its xDSL service. Specifically, and referring to FIG. 3, at step 300 DNS server 150 receives a dial-up request from a user. Then, at step 305, DNS server 150 (or an associated computer) looks up account information relevant to the user that has just dialed in. The user can be identified by user name and/or password that is often required in order to access a dial-up account. Techniques for accessing relevant databases for this purpose are well-known to those skilled in the art. At step 310 it is determined from that account information whether the customer who has just dialed-in normally accesses the Internet via xDSL service. If not, the process ends at step 315.

However, if the user that has just dialed-in normally accesses DNS server 150 via xDSL service, then at step 320 a trouble ticket, for example, preferably is generated that indicates that there is a likely failure in the xDSL service that this particular user normally uses. This trouble ticket is preferably then passed to the appropriate personnel for action. At step 325, the trouble ticket is stored and then at step 330 an email may be generated and sent to the customer/user notifying him that the failure of his xDSL service has been detected and will be corrected as soon as possible. The customer will receive this email via his dial-up connection. Alternatively, or in addition, the pop-up window that is displayed to the user at step 210 and/or step 220 (FIG. 2) can include a "canned" message that the xDSL failure has been detected and is being corrected by the xDSL service provider.

If several customers who normally use xDSL service suddenly begin using their dial-up modems to reach DNS server 150, then the xDSL service provider can quickly detect a failure in the xDSL service and quickly mobilize the appropriate personnel to correct the problem. Further, as more and more trouble tickets are stored, the xDSL service provider can subject those trouble tickets to a "data mining" process in which it can be determined, for example, the times at which xDSL service tends to fail as well as, based on the resolution of the failures, the type of equipment that experiences the most failures. Such data can be valuable to a telecommunications provider as a means to improve its service.

In an alternative embodiment, rather than waiting for the user to choose to access the Internet via his dial-up modem, applet 170 automatically changes the default communications port of the computer to the dial-up modem and automatically initiates a call to, e.g., the DNS server. Accordingly, even if the user is not using his computer, the xDSL service provider/ISP will learn that xDSL service has failed and will thus be able to respond to the problem on a more timely basis. Of course, applet 170 can also be configured such that the automatic dial-up modem implementation occurs only during certain times of the day, e.g., overnight or during the weekend. Preferably, use of the dial-up modem under these automatic circumstances is brief in order not to disrupt the normal use of the telephone line.

Thus, not only does the present invention provide helpful information to the user of xDSL service, but the xDSL service provider also benefits from the instant invention.

While the present invention has been described as sending a ping command to DNS server 150, one of ordinary skill in the art will understand that applet 170 can be programmed to ping any terminal equipment that might have an Internet Protocol (IP) address. Indeed, it is within the scope of the present invention that applet 170 can attempt, at step 200, to access a website via a browser rather than issuing a ping command. Further, the present invention is not necessarily limited to the network topology illustrated in FIG. 1, but could be implemented in any number of network topologies as will be appreciated by those skilled in the art.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method of monitoring the status of xDSL service by a service provider, comprising the steps of:
    (a) sending from a user computer via xDSL service a request to which a response is expected;
    (b) determining if a response has been received;
    (c) if a response has not been received, establishing a connection from the user computer to a server of the service provider via dial-up modem;
    (d) monitoring by the service provider the connection via dial-up modem and determining the user's account information including whether the user is an xDSL service subscriber or customer; and
    (e) based upon detecting the connection to the server via dial-up modem and determining that the user is an xDSL service subscriber or customer, concluding by the service provider that xDSL service has failed and issuing by the service provider a trouble ticket requesting repair of the xDSL service.

2. The method of claim 1, further comprising generating and sending an email to the user informing the user that an xDSL service failure has been detected and is being corrected.

3. The method of claim 1, further comprising storing a plurality of trouble tickets.

4. The method of claim 3, further comprising subjecting the trouble tickets to a data mining process.

5. The method of claim 1, wherein the request is a ping command.

6. The method of claim 1, wherein software running on the user computer executes at least steps (a)–(c).

7. The method of claim 1, wherein a plurality of requests are sent, each being sent after a predetermined delay.

8. The method of claim 1, further comprising notifying the user when xDSL service has been restored.

* * * * *